Oct. 29, 1968  R. J. HOVEY  3,408,134
VARIABLE DENSITY LIGHT-FILTERING MEANS UTILIZING
STANNOUS CHLORIDE AND THIAZINE DYE
Filed April 22, 1963  3 Sheets-Sheet 1

INVENTOR.
RICHARD J. HOVEY
BY James P. McAndrews
ATTORNEY

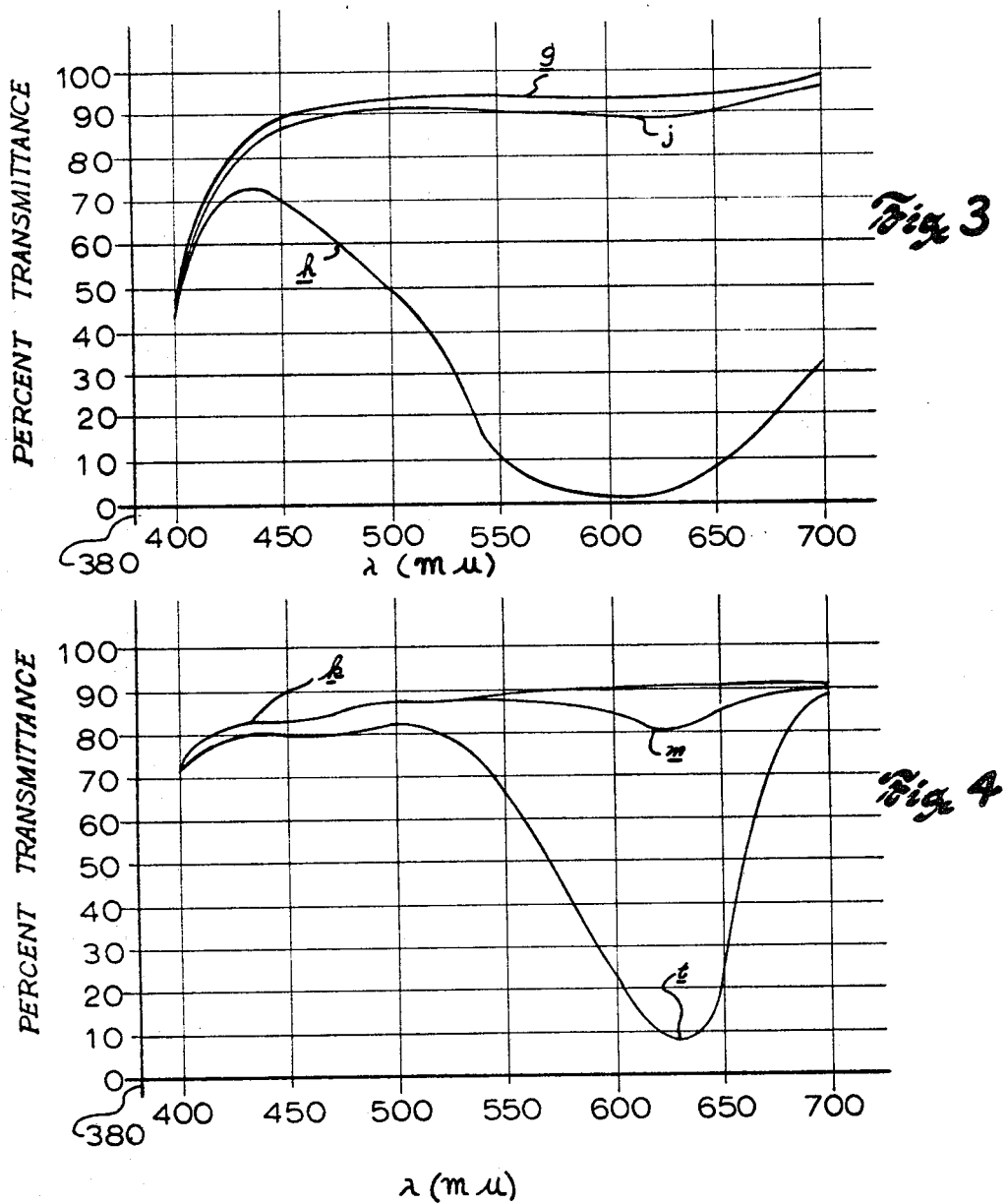

Oct. 29, 1968   R. J. HOVEY   3,408,134
VARIABLE DENSITY LIGHT-FILTERING MEANS UTILIZING
STANNOUS CHLORIDE AND THIAZINE DYE
Filed April 22, 1963   3 Sheets-Sheet 3

INVENTOR.
RICHARD J. HOVEY
BY James P. McAndrews
ATTORNEY

United States Patent Office 3,408,134
Patented Oct. 29, 1968

3,408,134
VARIABLE DENSITY LIGHT-FILTERING MEANS UTILIZING STANNOUS CHLORIDE AND THIAZINE DYE
Richard J. Hovey, Worcester, Mass., assignor to American Optical Company, Southbridge, Mass., a voluntary association of Massachusetts
Filed Apr. 22, 1963, Ser. No. 274,415
8 Claims. (Cl. 350—160)

The field of this invention is that of light filters of variable optical density and the invention relates more particularly to novel and improved light filtering means having the property of automatically varying in optical density in response to variation in the light incident upon the filtering means.

Light filters of variable optical density can be very useful particularly where flash conditions or variations in sunlight or the like make protection against frequent or sudden changes in light intensities desirable. For example, variable density light filters can be employed in protective spectacle lenses and the like for permitting variation of optical density as the wearer moves between sunlight and shade or between daylight and artificial light or as the wearer is exposed to flashes of light and the like in various industrial and military environments. However, prior to the present invention, many such potential applications of variable density light filters have not been practical for the reason that no efficient and economical means have been available for initiating and regulating the variation of filter density.

It is an object of this invention to provide novel and improved variable density light filtering means; to provide such filtering means which have the property of automatically varying in optical density in response to variation in the light incident on the filtering means; and to provide such filtering means in which the variation in optical density is proportional to the variation in said incident light. It is a further object of this invention to provide variable density light filtering means which can be substantially completely transparent under selected lighting conditions and which can acquire substantial light-absorbing properties in response to the increasing incidence of light thereon; to provide such filtering means which can be very responsive to increasing incidence of light thereon for rapidly acquiring or increasing its light-absorbing properties; and to provide such filtering means which can be very responsive to decreasing incidence of light thereon for rapidly decreasing or eliminating its light-absorbing properties. It is an additional object of this invention to provide light filtering means of variable optical density which can be varied in optical density a multiplicity of times; to provide such filtering means which can display uniform light-absorbing properties over its effective area; to provide such light filtering means which are of light, compact, rugged and inexpensive construction; and to provide such light filtering means which are adapted for use as protective spectacle lenses and the like.

Other objects, advantages and details of the variable density light filtering means provided by this invention appear in the following detailed description of preferred embodiments of the invention, the detailed description referring to the drawings in which:

FIGS. 1–4 inclusive are graphs illustrating variations in the light-absorbing properties of light filtering means provided by this invention;

Figure 1:
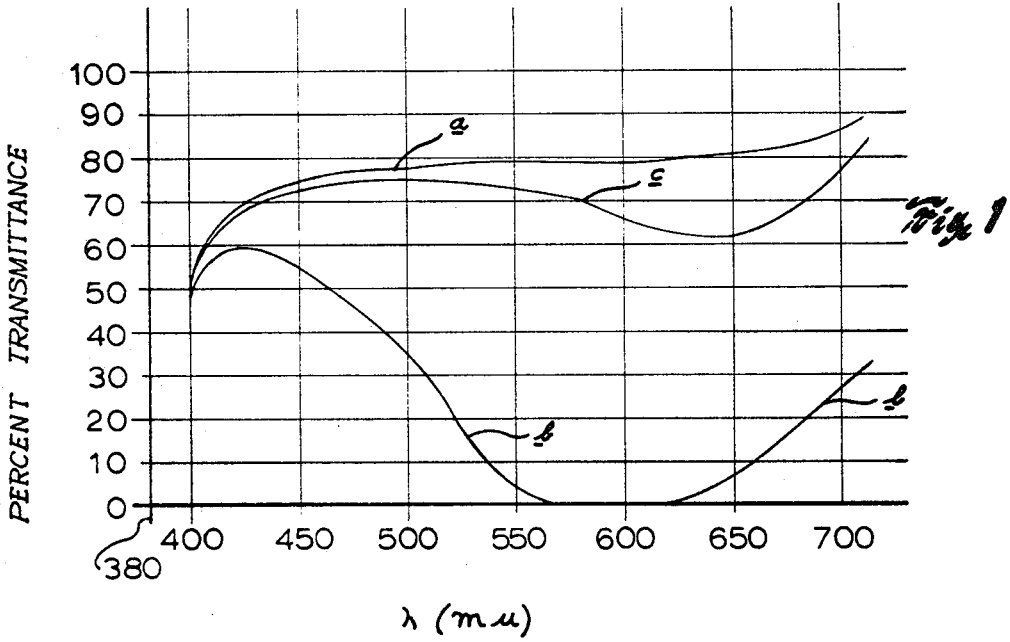

In accordance with this invention, a leucobase of a thiazine dye such as Azure C can be formed in a suitable solvent with a quantity of the reversible reducing agent stannous chloride. This solution can be photochromic in that the optical density or light-absorbing properties of the solution can change in response to variations in irradiation of the solution with light of selected wavelengths. For example, the dye Azure C can be placed in aqueous solution in a concentration of $9.26 \times 10^{-4}$ M together with stannous chloride in concentration of $5.64 \times 10^{-3}$ M, the solution being acidified by the addition of hydrogen chloride in concentration of 0.33 M. This solution can be highly transmissive in a room having more or less average artificial illumination. However, when irradiated with ultraviolet and short wavelength visible light of relatively greater intensities, the solution rapidly acquires a pronounced blue color and displays substantially increased light-absorbing properties. For example, a sample of this solution having a thickness of approximately one centimeter can have absorptive and transmissive properties substantially as indicated by curve $a$ in FIG. 1 in a room having more or less average artificial illumination. (Actually, curve $a$ represents the absorptive and transmissive properties of the sample solution under slightly higher than average illumination conditions within apparatus for testing the absorptive and transmissive properties of the solution.) When this sample of the solution is irradiated at a spacing of one centimeter for a period of one minute by two four-watt ultraviolet lamps such as those sold by General Electric Company under the designation BLB lamps, the solution acquires absorptive and transmissive properties substantially as indicated by curve $b$ in FIG. 1. When returned to the average room illumination conditions above described for a period of about four and one-half minutes, the sample of solution can return to its highly transmissive state and can display absorptive and transmissive properties substantially as indicated by curve $c$ in FIG. 1. It should be noted that these reactions of the solution sample are those which occur at room temperature but that change in temperature of the solution merely alters the rate of the described reactions. An increase in temperature, for example, will result in a decrease in the rate of color build-up in the solution during irradiation and will result in an increase in the rate of return of the solution to its highly transmissive state under average illumination conditions.

Although it is not intended to limit the scope of this invention by reference to any theory as to the chemical reactions which may take place in the solution above described, it is believed that stannous ions are oxidized in solution to form stannic ions and that, although stannic ion does not react with the reduced or leuco form of the thiazine dye under the average illumination conditions described, the stannic ion can react to oxidize the dye to a colored state when the dye has been exposed to or excited by ultraviolet and near ultraviolet light.

The concentration of leucobase thiazine dye which is employed in the solution can be substantially reduced while still achieving a significant degree of the described photochromic effect. For example, the thiazine dye Azure C can be placed in an aqueous solution in concentration of $2.81 \times 10^{-5}$ M with stannous chloride in concentration of $3.10 \times 10^{-3}$ M, the solution being acidified by the addition of hydrogen chloride in concentration of 0.30 M. Under the average artificial lighting conditions above described, a one centimeter thick sample of the solution can have the absorptive and transmissive properties substantially as indicated by curve $d$ in FIG. 2. After irradiation of the solution sample by ultraviolet lamp in the manner also above described, the solution sample can display absorptive and transmissive properties as indicated by curve $e$ in FIG. 2. After return of the sample solution to the noted average illumination conditions for a period of about four and one-half minutes, the sample can display the properties indicated by curve $f$ in FIG. 2.

Conversely and preferably, the concentration of leucobase thiazine dye which is employed can be substantially increased to saturation of the solution for increasing the photochromic effects and the rate of the photochromic effects which can be obtained. For example, the thiazine dye Azure C can be placed in aqueous solution for saturating the solution and stannous chloride can be added for achieving a concentration thereof of $9.18 \times 10^{-3}$ M, the solution being acidified by the addition of hydrogen chloride in concentration of 0.40 M. Under the noted average artificial lighting conditions, a one centimeter thick sample of the solution can be substantially colorless as indicated by the curve $g$ in FIG. 3. When irradiated by ultraviolet lamps in the manner above described, the sample of solution displays the absorptive and transmissive properties as indicated by curve $h$ in FIG. 3. Further, after return to the noted average illumination conditions for a period of only three and one-half minutes, the sample of solution can substantially completely return to its colorless states as indicated in curve $j$ in FIG. 3. In this solution, it can be seen that the absorptive properties can be substantial under the full irradiation described and in fact the sample of solution was seen to acquire a very pronounced blue color almost immediately after irradiation of the sample by the ultraviolet lamps had begun. Further, the rate of the return of the solution to a substantially colorless state can also be seen to be quite rapid.

Other leucobase thiazine dyes can be employed for forming the desired variable density light filtering means as seen by reference to the following Examples A–F inclusive.

tially increases the rate at which the solutions return to their more highly transmissive state under average illumination conditions. Actually, it has been found that the aqueous solutions cannot achieve suitable variations in optical density in response to variations of incident light unless the pH of the solutions is at least less than about 1.3. For example, an aqueous solution of a thiazine dye Azure B in concentration of $2.87 \times 10^{-5}$ M and stannous chloride in concentration of $6.81 \times 10^{-4}$ M was found to display suitable photochromic effects where the solution had been acidified by the addition of hydrogen chloride in a concentration of only 0.05 M. The requirement of relatively high concentrations of hydrogen ion in the aqueous solutions provided by this invention is believed to be explained in that such hydrogen ion concentrations can reduce any tendency for hydrolysis of stannic ions in the solutions, thereby permitting more rapid reaction between the stannic ions and the selected dyes when the solutions are irradiated with ultraviolet light.

It should be noted that variable density light filtering solutions can be prepared with leucobase thiazine dyes by employing other solvents than water. For example, where the thiazine dye Azure A has been placed in alcohol solution in a concentration of $5.00 \times 10^{-5}$ M with stannous chloride in concentration of $5.00 \times 10^{-3}$ M, the solution has achieved adequate photochromic effects. For example, a one centimeter thick sample of this solution can display the absorptive and transmissive properties indicated by the curve $k$ in FIG. 4 under average artificial illumination conditions such as have been previously described. However, when exposed to ultraviolet light in the manner above described, the solution has rapidly acquired the absorptive and transmissive properties indicated by the curve $t$ in FIG. 4. Further, when returned to the noted average illumination conditions for a period of about eight

|  | Example | | | | | |
|---|---|---|---|---|---|---|
|  | A | B | C | D | E | F |
| Toluidine blue O | $8.47 \times 10^{-4}$ M | | | | | |
| New methylene blue | | $6.92 \times 10^{-4}$ | | | | |
| Methylene blue | | | $8.56 \times 10^{-4}$ M | | | |
| Thionine | | | | Saturation | | |
| Azure B | | | | | $7.73 \times 10^{-4}$ M | |
| Azure A | | | | | | $4.29 \times 10^{-4}$ |
| Stannous chloride | $3.44 \times 10^{-3}$ M | $2.81 \times 10^{-3}$ M | $2.95 \times 10^{-3}$ M | $2.86 \times 10^{-3}$ M | $2.07 \times 10^{-3}$ M | $2.86 \times 10^{-3}$ M |
| Hydrogen chloride | 0.33M | 0.25M | 0.29M | 0.20M | 0.20M | 0.29M |

These solutions each display photochromic effects similar to those described above with reference to solutions embodying the dye Azure C. Thus each of these solutions can serve as variable density light filtering means according to this invention.

It has been noted above that increasing the concentration of the leuco thiazine dye in a solution tends to increase the rate at which the solution can respond to irradiation with ultraviolet light for acquiring increased light-absorbing properties. This can be explained in that more leuco dye in such a solution can be exposed to the exciting light. It is also believed that the described photochromic solutions should properly include at least stoichiometric quantities of stannous chloride for assuring that all of the dye in solution can be properly reacted with stannous chloride. It has also been empirically noted that increasing the concentration of stannous chloride in a solution can substantially increase the rate at which a solution can return to its more transmissive state when the noted average illumination conditions have been restored. Preferably, in order to obtain a reasonably rapid rate of such return of the solution to its more transmissive state, the concentration of stannous chloride in solution should be at least five times greater than the concentration of dye in the solution.

In the variable density light filtering solutions thus far described, sufficient hydrogen chloride has been included to assure that the solution can have a pH of less than 1.0. In this regard, it has been found that increasing acidity in aqueous solutions provided by this invention substanminutes, the solution has displayed properties as indicated by the curve $m$ in FIG. 4. It should be noted that such alcohol solutions can be substantially neutral or acidic without retarding the described photochromic effects.

Figure 5:
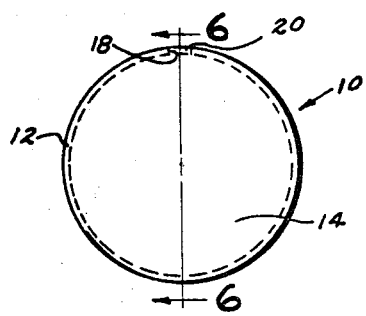
FIG. 5 is a plan view of a variable density light filter provided by this invention.
Figure 6:
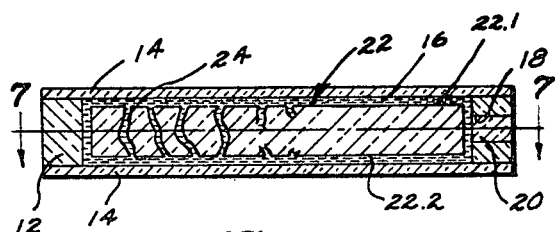
FIG. 6 is an enlarged section view along line 6—6 of FIG. 5.
Figure 7:
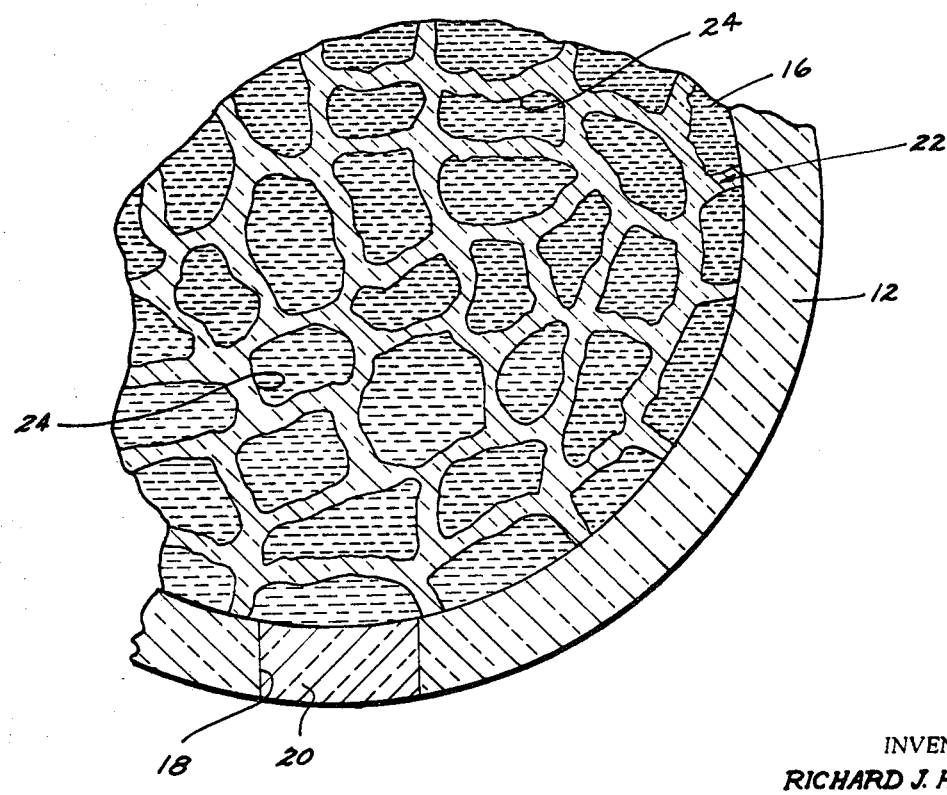
FIG. 7 is a partial section view along line 7—7 of FIG. 6.

It must be understood that the chemical reaction which takes place in the above noted photochromic solutions is believed to comprise a reversible photo-oxidation process. Accordingly, it is extremely important that all atmospheric oxygen and the like be excluded from the chemical system to assure that described chemical reactions can occur repeatedly in response to variations in incident light over a long period of time. As shown in FIG. 5, a cell 10 can be formed of an annular member 12 and two flat disc members 14 each of which embodies a suitable light-transmitting material. These light-transmitting members can be adhered together with a suitable transparent cement to form the cell for enclosing or encapsulating a quantity of a photochromic solution 16 therein. Preferably, the annular member 12 has an aperture 18 therein through which the solution 16 can be introduced to the cell, this aperture being sealed with the plug 20 and a suitable cement after filling of the cell as will be understood. Various light-transmitting materials and cements can be employed for forming the cell but preferably, the annulus 12, the discs 14 and the plug 20 can be formed of polymethyl methacrylate and these members can be adhered with an ethylene chloride cement. It should be understood that although a thin flat circular cell has been illustrated, the cell could be rectangular in outline or could be relatively quite thick or could even be lens-shaped or the like within the scope of this invention.

Figure 2:
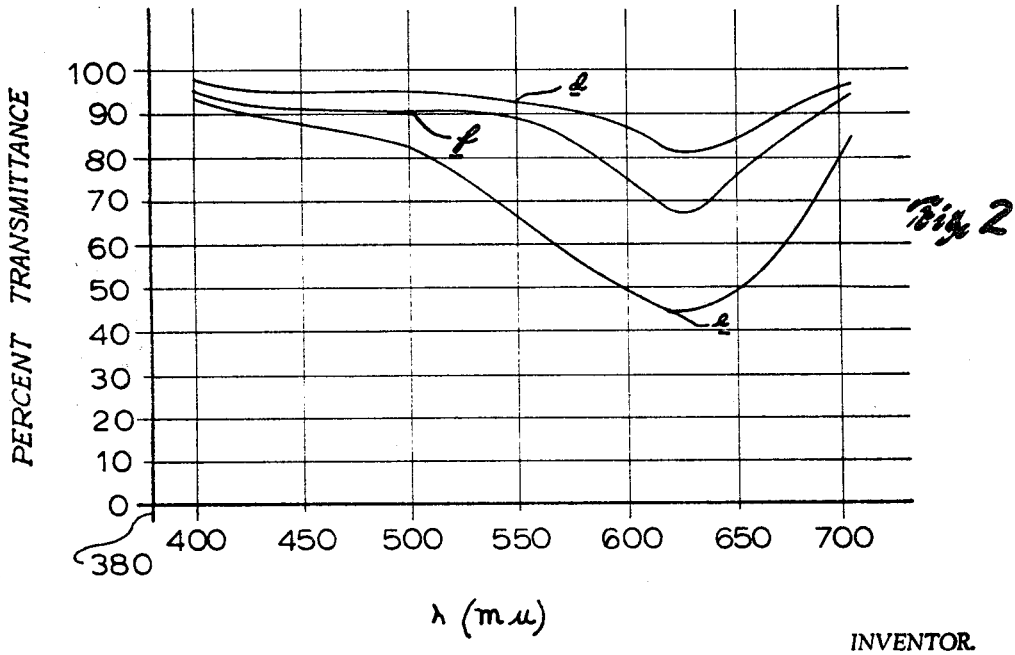

In a desirable embodiment of this invention, a porous, and preferably microporous, filler or matrix-like member 22 of light-transmitting material can be disposed within the central cavity of the cell 10. This porous filler or matrix can preferably be optically polished along its outer surfaces 22.1 and 22.2 and the like and can be filled with a selected photochromic solution previously described. Most desirably, as illustrated in FIG. 2, the pores 24 of the filler do not extend between the surfaces 22.1 and 22.2 in a direct perpendicular line but extend along oblique or tortuous paths to assure that some of the solution 16 can intercept substantially all light rays which may be incident upon the filler surfaces 22.1 and 22.2, in a direction normal to such surfaces. This filler can serve to restrict any tendency of the photochromic solution 16 to separate or form any precipitates and also serves to limit conventional diffusion of the solution with the cell. This particularly prevents any tendency for temporary streaking of the photochromic solution during transition from one degree of transmissivity to another and assures that the filtering means is uniformly transmissive throughout all of its parts at any time.

The filler 22 can be formed of any suitable porous or microporous transparent material but is preferably selected to be of a material having a refractive index corresponding quite closely to that of the photochromic solution 16 employed therewith. Desirably, the filler can comprise a very high silicate glass such as that sold by Corning Glass Works of Corning, New York under the trade name porous Vycor.

It should be understood that particular embodiments of the variable density light filtering means provided by this invention have been described by way of illustration but that this invention includes all modifications and equivalents thereof which fall within the scope of the appended claims.

What I claim is:

1. A variable density light-filtering means comprising a solution of the reversible reducing agent stannous chloride, said solution having a pH adjusted to prevent precipitation of stannous and stannic ions, and a thiazine dye adapted to be colorless in said solution in the absence of ultraviolet radiation and to be colored in said solution under ultraviolet irradiation.

2. A variable density light-filtering means comprising a solution of the reversible reducing agent stannous chloride, said solution having a pH adjusted to prevent precipitation of stannous and stannic ions, and a thiazine dye selected from the group consisting of Azure A, Azure B, Azure C, Toluidine Blue O, Methylene Blue, New Methylene Blue and Thionine, said solution being colorless in the absence of ultraviolet radiation and being colored under ultraviolet irradiation.

3. A variable density light-filtering means comprising a solution of the reversible reducing agent stannous chloride, said solution having a pH adjusted to prevent precipitation of stannous and stannic ions, and a thiazine dye selected from the group consisting of Azure A, Azure B, Azure C, Toluidine Blue O, Methylene Blue, New Methylene Blue and Thionine sealed within a transparnt cell in the absence of extraneous oxidizing agents, said solution being colorless in the absence of ultraviolet radiation and being colored under ultraviolet irradiation.

4. A variable density light-filtering means comprising a solution of the reversible reducing agent stannous chloride, wherein said solution is an acidified aqueous solution having a pH less than approximately 1.3 and a thiazine dye selected from the group consisting of Azure A, Azure B, Azure C, Toluidine Blue O, Methylene Blue, New Methylene Blue and Thionine sealed within a transparent cell in the absence of extraneous oxidizing agents, said solution being colorless in the absence of ultraviolet radiation and being colored under ultraviolet irradiation.

5. A variable density light-filtered means comprising a solution of the reversible agent stannous chloride, wherein said solution is an alcohol solution having a pH less than approximately 7 and a thiazine dye selected from the group consisting of Azure A, Azure B, Azure C, Toluidine Blue O, Methylene Blue, New Methylene Blue and Thionine sealed within a transparent cell in the absence of extraneous oxidizing agents, said solution being colorless in the absence of ultraviolet radiation and being colored under ultraviolet irradiation.

6. A variable density light-filtering means comprising a solution of the reversible reducing agent stannous chloride, said solution having a pH adjusted to prevent precipitation of stannous and stannic ions and a thiazine dye selected from the group consisting of Azure A, Azure B, Azure C. Toluidine Blue O, Methylene Blue, New Methylene Blue and Thionine sealed within a transparent cell in the absence of extraneous oxidizing agents, wherein the concentration of said dye is greater than about $2.81 \times 10^{-5}$ M and the concentration of said stannous chloride is at least about 5 times greater than the concentration of said dye, said solution being colorless in the absence of ultraviolet radiation and being colored under ultraviolet irradiation.

7. A variable density light filter comprising a solution of a thiazine dye selected from the group consisting of Azure A, Azure B, Azure C, Toluidine Blue O, Methylene Blue, New Methylene Blue and Thionine in a concentration greater than about $2.81 \times 10^{-5}$ M and the reversible reducing agent stannous chloride in a concentration at least about 5 times greater than the concentration of said thiazine dye, said solution having a pH adjusted to prevent precipitation of stannous and stannic ions, said solution being disposed within the pores of a porous transparent member, said transparent member being sealed within a transparent cell in the absence of extraneous oxidizing agent, said solution being colorless in the absence of ultraviolet radiation and being colored under ultraviolet irradiation.

8. A variable density light filter comprising a solution of a thiazine dye selected from the group consisting of Azure A, Azure B, Azure C. Toluidine Blue O, Methylene Blue, New Methylene Blue and Thionine in a concentration greater than about $2.81 \times 10^{-5}$ M and the reversible reducing agent stannous chloride in a concentration at least about 5 times greater than the concentration of said thiazine dye, said solution having a pH adjusted to prevent precipitation of stannous and stannic ions, said solution being disposed within the pores of a microporous silicate glass matrix member having opposite surfaces thereof optically finished, said matrix member being sealed within a transparent cell in the absence of extraneous oxidizing agents, said solution being colorless in the absence of ultraviolet radiation and being colored under ultraviolet irradiation.

References Cited

UNITED STATES PATENTS

| 3,266,370 | 8/1966 | Marks et al. | 350—160 |
| 2,324,060 | 7/1943 | Boughton | 96—60 X |
| 2,335,659 | 11/1943 | Fraenckel et al. | 178—7.5 |
| 3,121,632 | 2/1964 | Sprague et al. | 96—48 |

OTHER REFERENCES

Ellis, C. and Wells, A. A., The Chemical Action of Ultraviolet Rays, N.Y. Reinhold, 1941, p. 631, QD 601, E45.

Menzies, D. W., Photo-Sensitivity of Thiazine Dyes. Nature, vol. 191, No. 4787, pp. 505–506, July 29, 1961, Q1, N2.

DAVID SCHONBERG, *Primary Examiner.*

T. H. KUSMER, *Assistant Examiner.*